(12) United States Patent
Takura et al.

(10) Patent No.: US 6,386,224 B2
(45) Date of Patent: May 14, 2002

(54) HIGH LEVEL WATER SUPPLYING AND DISTRIBUTING SYSTEM

(75) Inventors: Toshiyasu Takura, Tokyo; Yoshifumi Tanabe, Shizuoka, both of (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/776,687

(22) Filed: Feb. 6, 2001

(30) Foreign Application Priority Data

Feb. 10, 2000 (JP) ........................................ 2000-032941
Jul. 25, 2000 (JP) ........................................ 2000-224414

(51) Int. Cl.$^7$ ................................................ E03C 1/02
(52) U.S. Cl. ........................................ 137/265; 137/255
(58) Field of Search ................................ 137/255, 265, 137/266, 263, 571

(56) References Cited

U.S. PATENT DOCUMENTS

| | | | | |
|---|---|---|---|---|
| 3,763,824 A | * | 10/1973 | Schoon | ........................ 119/4 |
| 4,290,735 A | | 9/1981 | Sulko | |
| 5,421,162 A | * | 6/1995 | Gustafson et al. | ................ 62/7 |

FOREIGN PATENT DOCUMENTS

| | | |
|---|---|---|
| GB | 2 321 926 | 8/1998 |
| JP | 6-116990 | 4/1994 |
| JP | 6-136794 | 5/1994 |
| JP | 7-331711 | 12/1995 |

* cited by examiner

Primary Examiner—Kevin Lee
(74) Attorney, Agent, or Firm—Oblon, Spivak, McClelland, Maier & Neustadt, P.C.

(57) ABSTRACT

There are provided water supplying pumps and check valves in the connecting pipe passage connecting a plurality of water supplying tanks arranged for each of the floors, and the connecting pipe passage connecting the water supplying tank at the lowermost floor with a water pipe. The water supplying tanks are provided with dampers having air chambers. Hydraulic pressure in each of the water supplying tanks is detected, operation of the water supplying pump is controlled in response to the hydraulic pressure, thereby the hydraulic pressures in all the water supplying tanks are made equal and the variation in hydraulic pressure of the water supplying tanks is absorbed by the dampers. With such an arrangement as above, even if the variation in hydraulic pressure is severe, the water supplying pump does not show any gradual repeating of stopping of driving and so control of the hydraulic pressure can be carried out accurately and easily.

17 Claims, 8 Drawing Sheets

HIGH LEVEL WATER SUPPLYING AND DISTRIBUTING SYSTEM

BACKGROUND OF THE INVENTION

1. Field of the Invention

This invention relates to a high level water supplying and distributing system.

2. Description of the Prior Art

In the prior art, as a water supplying device used in a multistoried building, there is provided a water supplying device in which water stored in a tank installed at a basement or the like is sucked up to another tank installed at a penthouse and then water is supplied from the tank at the penthouse to each of the floors in the building. However, in such a water supplying device as described above, tanks are required at the basement or at the penthouse and not only the problems in regard to a facility, but also a difficult cleaning in the tanks are present, so that a problem in regard to health of persons living in the building is also pointed out. In view of these facts, there have been made several proposals in the art.

For example, as already described in the gazette of Japanese Patent Laid-Open No. Hei 6-116990, there is provided a water supplying device in which a water storing section having a pipe wound in a helical manner is covered by thermal insulating material, installed at the penthouse of a building, a pump connected to a water pipe is driven, water is pumped up to the water storing section and water is supplied from the water storing section to each of the floors.

In addition, as already described in the gazette of Japanese Patent Laid-Open No. Hei 7-331711, there is provided a water supplying system in which a plurality of water supplying pipes for supplying water to a low-storied floor zone of the first floor to the third floor are connected to a plurality of water supplying pipes of middle or higher storied zone which is higher than the third floor in a vertical direction, and wherein a booster pump, a flow rate switch for detecting an amount of supplied water, two pressure switches for detecting water pressure at a suction side and a discharging side of the booster pump, and a pressure tank connected to the discharging side of the booster pump are connected in sequence between the water supplying pipes.

In this water supplying system, when water is supplied to the low-storied zone with water pressure of a water pipe and water is supplied to the middle and high storied zone, an operation of the booster pump is controlled and an amount of water within the pressure tank is maintained to a desired value.

Further, as already described in the gazette of Japanese Patent Laid-open No. Hei 6-136794, there is provided a water supplying device in which a cylindrical water supplying tank is arranged vertically from a basement to the upper-most floor of a building, this water supplying tank is defined into partitioned chambers at every predetermined floor, each of the partitioned chambers is provided with a pump for pumping up water kept in another partitioned chamber below the former chamber, the lower-most pump is connected to the water pipe, these pumps are energized under a value less than its lower limit hydraulic pressure to pump up water into the partitioned chamber, and when the hydraulic pressure in the partitioned chamber reaches its upper limit hydraulic pressure, the pumps are stopped under an operation of a pressure switch.

Some technical problems in the prior art above will be described as follows.

The water supplying device described in the gazette of Japanese Patent Laid-Open No. Hei 6-116990 employs a system in which after water is pumped up to the water storing section installed at the penthouse of a building, water is supplied to each of the lower floors. Accordingly, in order to supply water to the lower floors, a hydraulic pressure must be reduced. In order to reduce the hydraulic pressure, it is necessary to arrange a pressure reducing means and so useless electrical power for driving the pressure reducing means is consumed.

In addition, since the water storing section is installed only at the penthouse, a large amount of storing water is required to supply water to all the houses. In addition, in order to shield it against a direct sunlight, it requires to cover itself with the thermal insulating material, resulting in that a scale of the device is increased and transportation and installation of material substances at the time of work become troublesome.

In the case of the water supplying system described in the gazette of Japanese Patent Laid-Open No. Hei 7-331711, it is necessary to arrange a flow rate switch and two pressure sensors for controlling an operation of the pump to supply water into a pressure tank, whereby its control becomes complicated. In addition, it becomes necessary to prepare the pressure tank having a water storing function for absorbing variation in the amount of supplying water for the middle and higher floors and so dusts may easily be accumulated in the pressure tank. Accordingly, stained state at the pressure tank or its cleaning becomes a problem.

In the case of the water supplying device described in the gazette of Japanese Patent Laid-Open No. Hei 6-136794, an operation of the pump is controlled under an operation of a pressure switch, and when a large amount of water is supplied at a predetermined floor, a hydraulic pressure at the partitioned chamber at the corresponding floor is rapidly changed and every time the changed state occurs, water is supplied to the partitioned chamber. In this case, as the turning-on and turning-off of the pressure switch are frequently repeated through transmittance of pressure, the pressure switch is deteriorated or although not deteriorated, it becomes a cause for generating an erroneous operation. In addition, the partitioned chamber is normally closed by the opening or closing section, so that the dusts or the like may easily be accumulated. Further, if the amount of stored water is less, the hydraulic pressure is rapidly changed in reference to an amount of used water, so that it is necessary to increase a volume of partitioned chamber more than a water supplying capability, whereby the size of the device is increased.

SUMMARY OF THE INVENTION

It is an object of the present invention to provide a high level water supplying and distributing system of which small-sized unit can be realized.

It is another object of the present invention to provide a high level water supplying and distributing system in which pressures in water supplying tanks at each of the floors can be equally controlled.

It is a still further object of the present invention to provide a high level water supplying and distributing system in which a rapid variation in hydraulic pressure can be restricted.

These and further objects of the present invention are achieved by the novel high level water supplying and distributing system of the present invention.

The high level water supplying and distributing system of the present invention is comprised of a plurality of water supplying tanks arranged in series along a height direction; a water supplying pipe connected to each of the water supplying tanks; and a water supplying pump and a check valve installed in a connected pipe passage for connecting the water supplying tanks to each other. It is possible to suck up water in sequence into each of the water supplying tanks under an operation of the water supplying pump and to supply water through the water supplying pipes. Since a check valve is arranged between each of the water supplying tanks, it becomes possible to supply water to the water supplying tank at the upper floor through the water supplying tank at the lower floor. However, hydraulic pressure of the water supplying tank at the upper floor does not act on the water supplying tank at the lower floor. With such an arrangement as above, it is possible to eliminate a necessity to reduce hydraulic pressure in the water supplying tank of the lower floor, equalize hydraulic pressures in all the water supplying tanks, and even if the severe variation in hydraulic pressure occurs, the water supplying pump does not repeat intermittent stop in driving operation and the accurate and easy control of the hydraulic pressure can be performed. Further, since supplemental supplying of water to the water supplying tank at the upper floor is carried out by pumping up water in sequence from the water supplying tank at the lower floor, so that pumping up water can be performed under application of the small-sized water supplying pump having a low pumping up capability. Further, since water in the water supplying tank at the lower floor is supplied to the water supplying tank just above the lower floor, dusts or the like are hardly accumulated at each of the water supplying tanks. With such an arrangement as above, it is possible to remarkably reduce a necessity for performing a cleaning operation of the tank.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, in which.

DETAILED DESCRIPTION OF THE PREFERRED EMBODIMENTS

Figure 1:
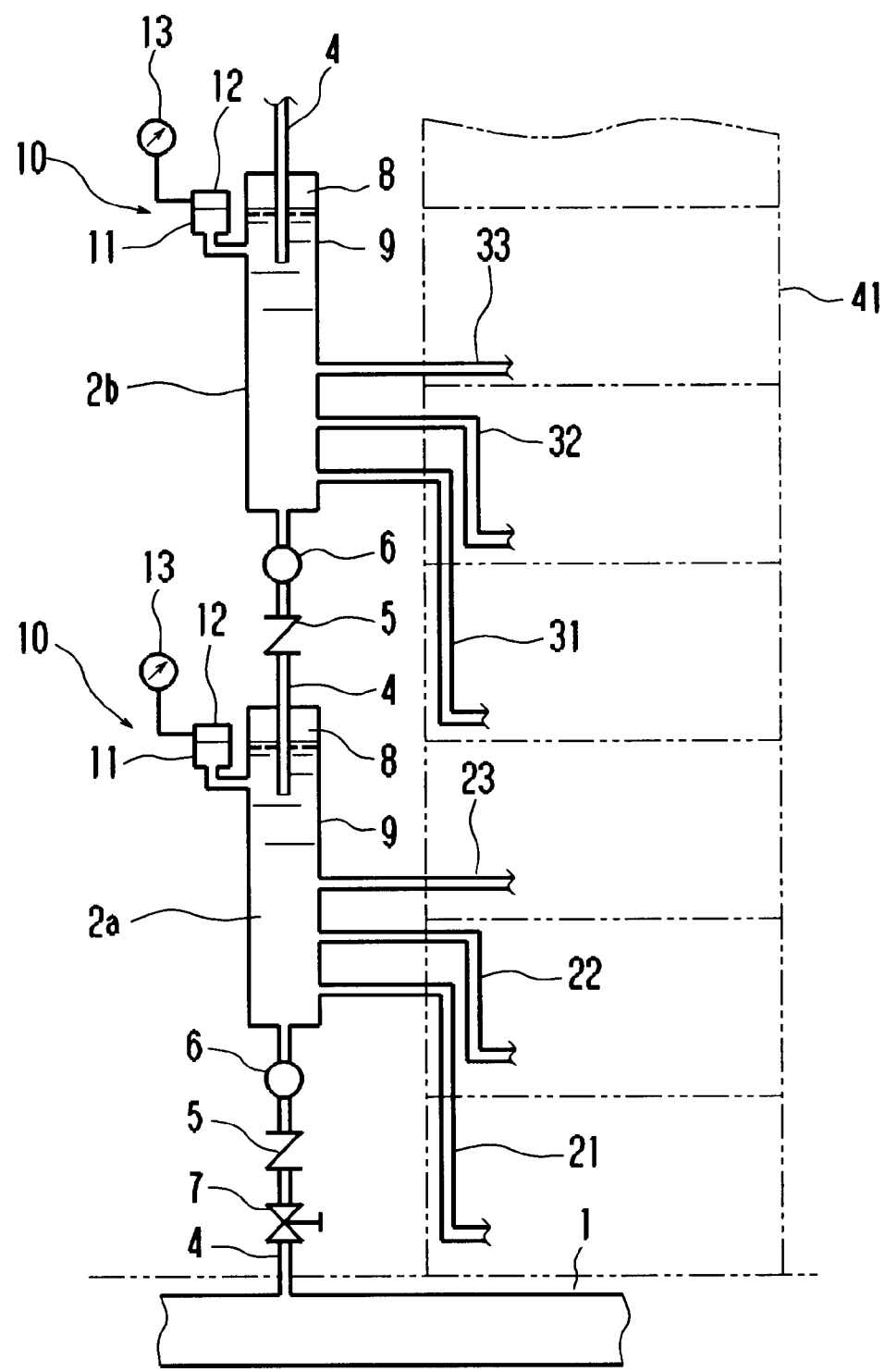
FIG. 1 is an illustrative view for schematically showing a structure of a high level water supplying and distributing system in a first preferred embodiment of the present invention.
Figure 2:
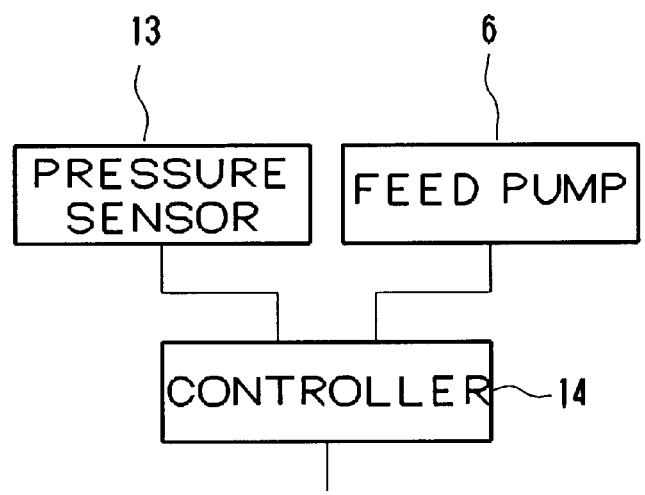
FIG. 2 is a block diagram for schematically showing a control circuit of a water supplying pump.

Referring to FIGS. 1 and 2, a first preferred embodiment of the present invention will be described. FIG. 1 is an illustrative view for schematically showing a structure of a high level water supplying and distributing system and FIG. 2 is a block diagram for schematically showing a control circuit of a water supplying pump.

In FIG. 1, a reference numeral 1 denotes a water pipe. To this water pipe 1 are connected a plurality of water supplying tanks 2a, 2b, . . . arranged in series along a height direction of a building. More practically, it is possible to install this high level water supplying and distributing system at a multistoried building 41. In this case, a plurality of water supplying tanks 2a, 2b, . . . are arranged in series along a height direction of floors in the multistoried building 41. These water supplying tanks 2a, 2b, . . . are formed into a cylindrical shape elongated in a vertical direction. Between the water supplying tank 2a at the lower-most floor and the water pipe 1, and between the water supplying tanks 2a, 2b, . . . themselves are connected with connecting pipe passages 4. To these connecting pipe passages 4 are connected check valves 5 and water supplying pumps 6 installed above the check valves. However, an opening or closing valve 7 is connected only to the connecting pipe passage 4 connected to the water pipe 1. In this example, although only two connected water supplying tanks 2a, 2b, . . . are illustrated, it is of course apparent that more than three water supplying tanks can be connected. To the water supplying tank 2a are connected water supplying and distributing pipes 21, 22, 23 for use in supplying water, and to the water supplying tank 2b are connected water supplying and distributing pipes 31, 32, 33 for use in supplying water.

In this case, dampers 9 having a sealingly closed air chamber 8 are installed at the upper section of each of the water supplying tanks 2a, 2b, . . . . The lower water supplying tank 2a will be described, wherein the air chamber 8 of the damper 9 is arranged at the upper part of the water supplying tank 2a and a position which is higher than the lower end opening of the connecting pipe passage 4 connecting the water supplying tank 2a with the water supplying tank 2b at the upper floor.

In addition, hydraulic pressure detecting means 10 for use in detecting hydraulic pressure in the water supplying tanks 2a, 2b, . . . are installed above the water supplying tanks 2a, 2b, . . . . These hydraulic detecting means 10 are constituted by a branch pipe 11 branched from the upper part of the water supplying tank 2a to a lateral side and a pressure sensor (a pressure gauge) 13 connected to the sealingly closed air chamber 12 at the upper part of the branch pipe 11.

Further, as shown in FIG. 2, there is provided a control device 14 acting as a control means for use in controlling an operation of the water supplying pump 6 with a detecting signal of a pressure sensor 13 installed in the hydraulic pressure detecting means 10. The control device 14 is constituted by a microcomputer for inputting a detecting signal of the pressure sensor 13, i.e. pressure data, comparing the pressure data with a predetermined appropriate hydraulic pressure, and controlling a driver (not shown) having the water supplying pump 6 connected thereto in reference to the result of comparison.

With such a configuration as above, hydraulic pressure in the water supplying tanks 2a, 2b, . . . vary in response to a water supplying amount. Water levels in the water supplying tanks 2a, 2b, . . . and the branch pipe 11 vary in response to this variation. The more the water level of the branch pipe 11 is increased, the more the air in the sealingly closed air chamber 12 is compressed, so that a pressure outputted by the pressure sensor 13 is increased. Accordingly, in the case that a pressure outputted by the pressure sensor 13 is less than a specified value, it is acknowledged that hydraulic pressure in the water supplying tanks 2a, 2b, . . . is kept low, so that if the hydraulic pressure in the water supplying tank 2b is low, the water supplying pump 6 below the water supplying tank 2b is driven and water in the lower water supplying tank 2a is supplied to the upper water supplying tank 2b.

In this case, since the air chamber 8 in the damper 9 in the water supplying tank 2a is arranged at the upper section of the water supplying tank 2a and at a position which is higher than the lower end opening of the connecting pipe passage 4 connecting the water supplying tank 2a with the water supplying tank 2b at the upper floor, the lower end of the connecting pipe passage 4 for connecting water supplying tanks 2a, 2b, . . . adjoining to each other in a vertical direction is positioned below the water surface lower than the air chamber 8. With such an arrangement as above, it is possible to perform a positive water supplying to the upper water supplying tank 2b. This is similarly applied to the case that another water supplying tank is connected above the water supplying tank 2b through a connecting pipe passage 4.

Even if hydraulic pressure in the lower water supplying tank 2a is decreased by the water supplied to the floor where the water supplying tank 2a supplies or decreased by pumping-up of water into the water supplying tank 2b at the upper floor, the hydraulic pressure of the upper water supplying tank 2b is shut off by the check valve 5 and does not act on the lower water supplying tank 2a. With such an arrangement as above, hydraulic pressure in the upper water supplying tank 2b is made to be stable. In this way, when hydraulic pressure in the water supplying tank 2a is decreased, the hydraulic pressure in the water supplying tank 2a is acknowledged by the pressure outputted by the pressure sensor 13 and the water supplying pump 6 is driven, whereby water is supplied from the water pipe 1.

In all water supplying tanks 2a, 2b, . . . , when the hydraulic pressure is recovered to the appropriate pressure through supplying of water, this state is acknowledged by an output of the pressure sensor 13 and then the water supplying pump 6 is stopped. In addition, since the hydraulic pressure in the water supplying tank 2b at the upper floor does not act on the water supplying tank 2a at the lower floor due to the presence of the check valve 5, it is possible to eliminate necessity for reducing the hydraulic pressure in the water supplying tank 2a at the lower floor and it is possible to equally manage hydraulic pressures in all the water supplying tanks 2a, 2b, . . . .

As described above, although the hydraulic pressure in either the water supplying tank 2a or 2b varies, the variation in pressure can be accommodated by compression or expansion of air in the air chamber 8 provided in the damper 9. Accordingly, even if the hydraulic pressure is varied severely, it is possible to alleviate the variation in pressure in the air chamber 12 in the branch pipe 11. With such an arrangement as above, the pressure outputted by the pressure sensor 13 is not varied gradually, and the water supplying pump 6 does not repeat the stopping in driving gradually, whereby control of the hydraulic pressure can be performed accurately and easily.

In addition, since the variation in hydraulic pressure can be absorbed by the damper 9, volume of the water supplying tanks 2a, 2b, . . . can be reduced and the small-sized unit can be attained.

Further, irrespective of the number of the water supplying tanks 2a, 2b, . . . , supplemental supplying of water into the water supplying tank 2b at the upper floor is carried out by pumping up water in sequence from the water supplying tank 2a at the lower floor, so that the pumping-up of water can be performed under application of the small-sized water supplying pump 6 having a low water pumping-up capability.

Further, in the case of the preferred embodiment of the present invention, only the two water supplying tanks 2a, 2b, . . . are illustrated, wherein water in the water supplying tank at the lower floor, including the case that further more water supplying tanks are connected, is supplied by the water supplying pump 6 to any of the water supplying tanks 2a, 2b, . . . just above it, so that dusts and the like are hardly deposited on each of the water supplying tanks 2a, 2b, . . . . With such an arrangement as above, it is possible to reduce necessity for performing the cleaning operation remarkably.

Figure 3:
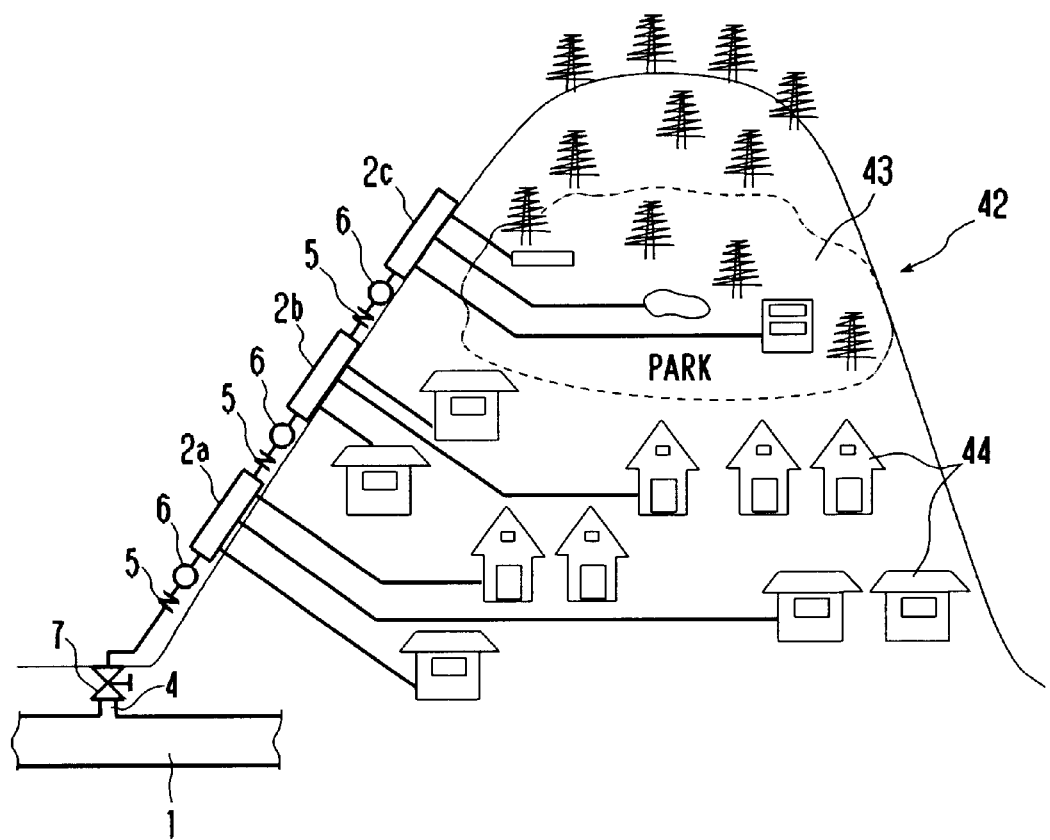
FIG. 3 is an illustrative view for showing another example of installation of the high level water supplying and distributing system.

Further, this high level water supplying and distributing system is mounted not only at the multistoried building 41, but also can be used in the case that water supplying is performed at various situations where a certain level difference is present, FIG. 3 is an illustrative view for showing an example in which the high level water supplying and distributing system of the preferred embodiment of the present invention is installed at a hill 42, as one example. That is, in the case of the example shown in FIG. 3, water is supplied to a park 43 or buildings 44 on the hill 42 by the high level water supplying and distributing system.

Figure 4:
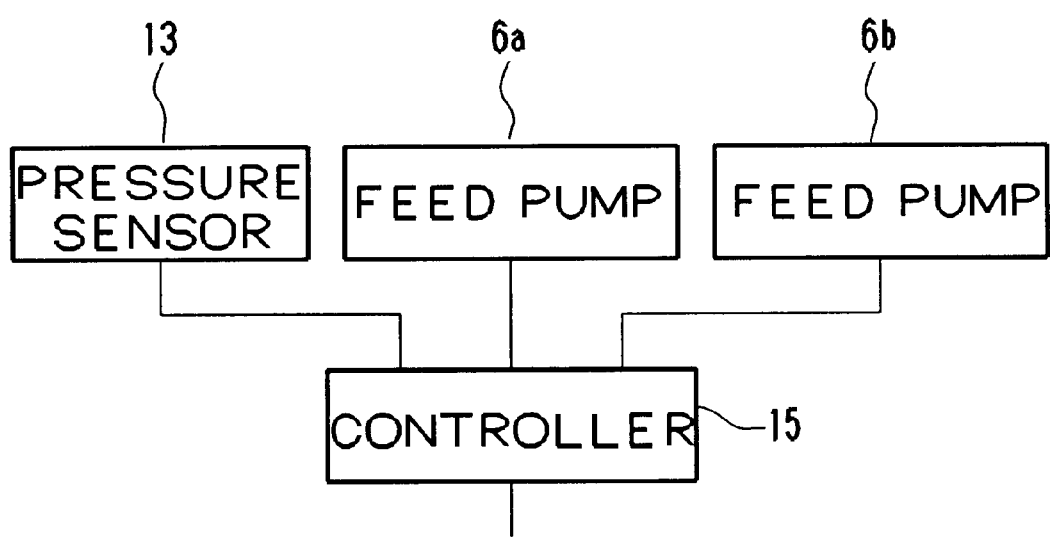
FIG. 4 is a block diagram for schematically showing a control circuit of a water supplying pump in a second preferred embodiment of the present invention.

Then, referring to FIG. 4, a second preferred embodiment of the present invention will be described. In the following description, the subject matter of the second preferred embodiment different from the aforesaid first preferred embodiment will be mainly described, and the same segments as those of the aforesaid first preferred embodiment are denoted by the same reference numerals and their description will be eliminated. FIG. 4 is a block diagram for schematically illustrating a control circuit for the water supplying pump.

There is provided a control device 15 acting as a control means for controlling an operation of each of the water supplying pumps 6a, 6b with a detecting signal of the pressure sensor 13 installed in the hydraulic pressure detecting means 10. This control device 15 is constituted by a microcomputer for inputting a detecting signal of the pressure sensor 13, i.e. pressure data, comparing the pressure data with a predetermined appropriate hydraulic pressure, and controlling a driver (not shown) having the water supplying pumps 6a, 6b connected thereto in reference to the result of comparison.

Further, each of the water supplying pumps 6a, 6b has a different output value and they are connected in parallel in the connecting pipe passage 4 (refer to FIG. 1). Then, the control device 15 is constituted such that the water supplying pumps 6a, 6b are selectively driven in response to a level of the output of the pressure sensor 13 installed in the hydraulic pressure detecting means 10.

With such an arrangement as above, in the case that the control device acknowledges that the hydraulic pressure is highly reduced in response to an output from the pressure sensor 13, the water supplying pump 6a having a larger output is driven to enable a level of hydraulic pressure to be increased rapidly. In the case that the control device acknowledges that the hydraulic pressure is not decreased much, the water supplying pump 6b having a lower output is driven to enable the hydraulic pressure to be recovered to an appropriate pressure under a state in which the variation in pressure is alleviated.

Figure 5:
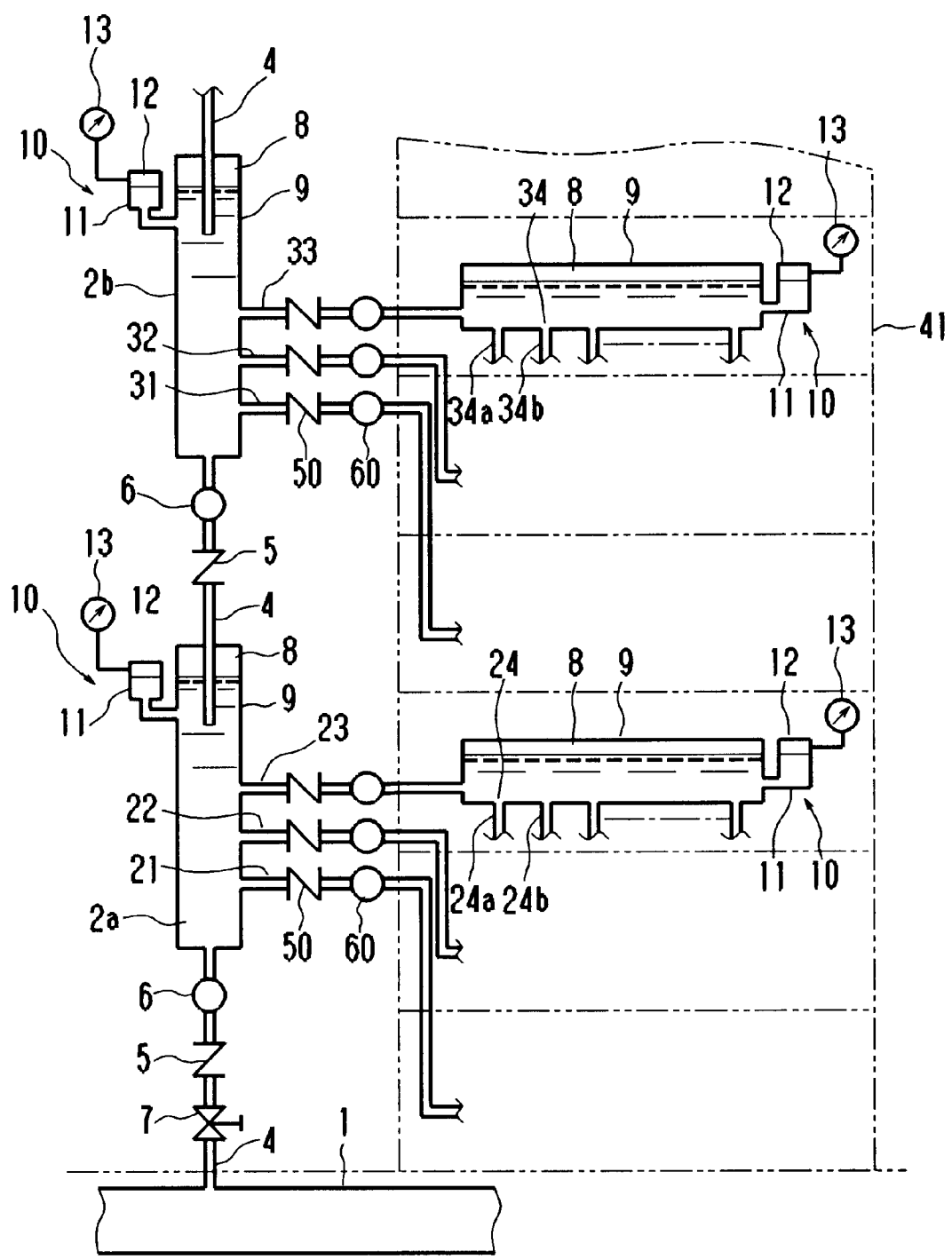
FIG. 5 is an illustrative view for schematically showing a structure of a high level water supplying and distributing system in a third preferred embodiment of the present invention.

Referring to FIG. 5, a third preferred embodiment of the present invention will be described. In the following description, the subject matter of the third preferred embodiment different from the aforesaid first preferred embodiment will be mainly described, and the same segments as those of the aforesaid first preferred embodiment are denoted by the same reference numerals and their description will be eliminated. FIG. 5 is an illustrative view for schematically showing a structure of the water supplying device.

To a cylindrical water supplying pipe 21 connected to the water supplying tank 2a is connected a second flat water supplying tank 24. Also to other water supplying pipes 22, 23 connected to the water supplying tank 2a is connected a second water supplying tank (not shown) similar to the second water supplying tank 24. To the second water supplying tank 24 are connected many water supplying pipes 24a, 24b, . . . for supplying water to a faucet and the like.

Similarly, to the water supplying pipe 31 connected to the upper cylindrical water supplying tank 2b is connected a second flat water supplying tank 34. Also to other water supplying pipes 32, 33 connected to the water supplying tank 2b is connected a second water supplying tank (not shown) similar to the second water supplying tank 34. To the second water supplying tank 34 are connected many water supplying pipes 34a, 34b, . . . for supplying water to a faucet and the like.

Above these second water supplying tanks 24, 34 are arranged a damper 9 provided with sealingly closed air chamber 8, and a hydraulic pressure detecting means 10 in the same manner as that of the configuration installed at the water supplying tanks 2a, 2b, . . . .

To each of the water supplying pipes 21, 22, 23, 31, 32, and 33 are connected a check valve 50 and a second water supplying pump 60. In this case, the check valve 50 is connected such that the hydraulic pressure fed from the second water supplying tanks 24, 34 is shut off. Operation of the second water supplying pump 60 for feeding water to the second water supplying tanks 24, 34 is controlled in response to pressure (corresponding to hydraulic pressures of the second water supplying tanks 24, 34) detected by the pressure sensor 13 installed at the hydraulic pressure detecting means 10. This is similar to a method as described in the aforesaid preferred embodiments in which the hydraulic pressure in the water supplying tank 2 or 3 is acknowledged in response to the output of the pressure sensor 13 and the operation of the water supplying pump 6 is controlled.

In such a configuration as described above, the hydraulic pressure in the second water supplying tanks 24, 34 varies in response to the amount of supplying water. Due to this variation, water levels in the second water supplying tanks 24, 34 and the branch pipe 11 are changed. The more the water level in the branch pipe 11, the more the air in the sealingly closed air chamber 12 is compressed, resulting in that the pressure outputted by the pressure sensor 13 is increased. Accordingly, in the case that the pressure outputted by the pressure sensor 13 is less than the specified value, it is acknowledged that the hydraulic pressures in the second water supplying tanks 24, 34 are kept low. Accordingly, the second water supplying pump 60 is driven to cause the water in the water supplying tanks 2a, 2b, . . . to be fed to the second water supplying tanks 24, 34.

In the case that the hydraulic pressures in the water supplying tanks 2a, 2b, . . . are decreased through supplying of water to the second water supplying tanks 24, 34, similar to that of the case described in the aforesaid preferred embodiment, the hydraulic pressures are recovered through driving of the water supplying pump 6.

In this case, since the second water supplying tanks 24, 34 are also provided with the damper 9, variation in hydraulic pressure can be effectively absorbed by dampers 9 in the water supplying tanks 2a, 2b, . . . and the dampers 9 in the second water supplying tanks 24, 34.

Although the water supplying pump 6 is installed among the water supplying tanks 2a, 2b, . . . and the second water supplying tanks 24, 34 and the second water supplying pumps 24, 34 are provided with the hydraulic pressure detecting means 10, as the hydraulic pressure in each of the second water supplying tanks 24, 34 is decreased, the hydraulic pressures in the water supplying tanks 2a, 2b, . . . are also decreased, resulting in that the water supplying pump 6 is controlled with a detecting signal of the hydraulic pressure detecting means 10 installed at the water supplying tanks 2a, 2b, . . . to enable the hydraulic pressures in the water supplying tanks 2a, 2b, . . . to be recovered to the appropriate values, whereby the hydraulic pressure detecting means 10 of the water supplying pump 60 and the second water supplying tanks 24, 34 may be eliminated. The check valve 50 may also be eliminated.

A fourth preferred embodiment of the present invention will be described. In the following description, the subject matter of the fourth preferred embodiment different from the aforesaid first preferred embodiment will be mainly described, and the same segments as those of the aforesaid first preferred embodiment are denoted by the same reference numerals and their description will be eliminated.

Figure 6:
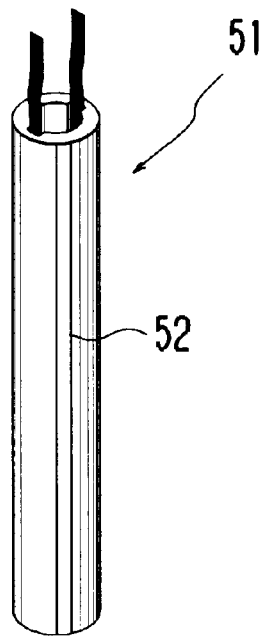
FIG. 6 is a schematic perspective view for showing a water level sensor used in a high level water supplying and distributing system in a fourth preferred embodiment of the present invention.
Figure 7:
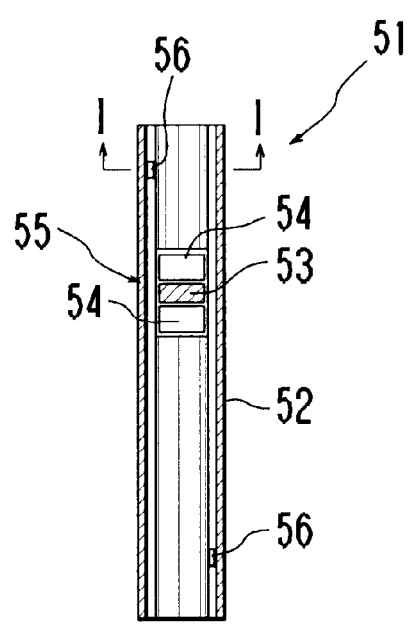
FIG. 7 is a longitudinal section for showing the water level sensor.
Figure 8:
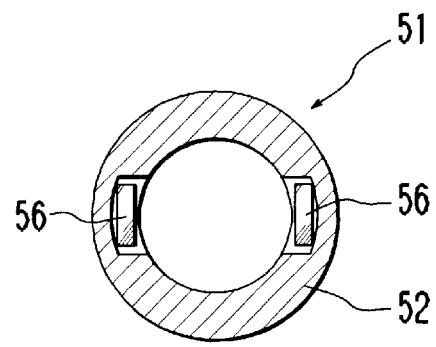
FIG. 8 is a sectional view taken along line A—A of FIG. 7.

In the preferred embodiment of the present invention, there is provided a water level sensor 51 acting as a water level detecting means as shown in a schematic perspective view of FIG. 6, a longitudinal section in FIG. 7 and a sectional view taken along line A—A of FIG. 7, respectively. This water level sensor 51 is made such that a float 55 having a permanent magnet 53 and an air chamber 54 therein is stored in a longitudinal cylinder 52 in such a way that it may be moved in a longitudinal direction and two locations of the upper segment and the lower segment at the inner circumference of the cylinder 52 are provided with hall ICs 56. The hall IC 56 is a well-known circuit configuration capable of outputting a H level signal when a magnetic field with an intensity more than a predetermined value is detected.

Figure 9:
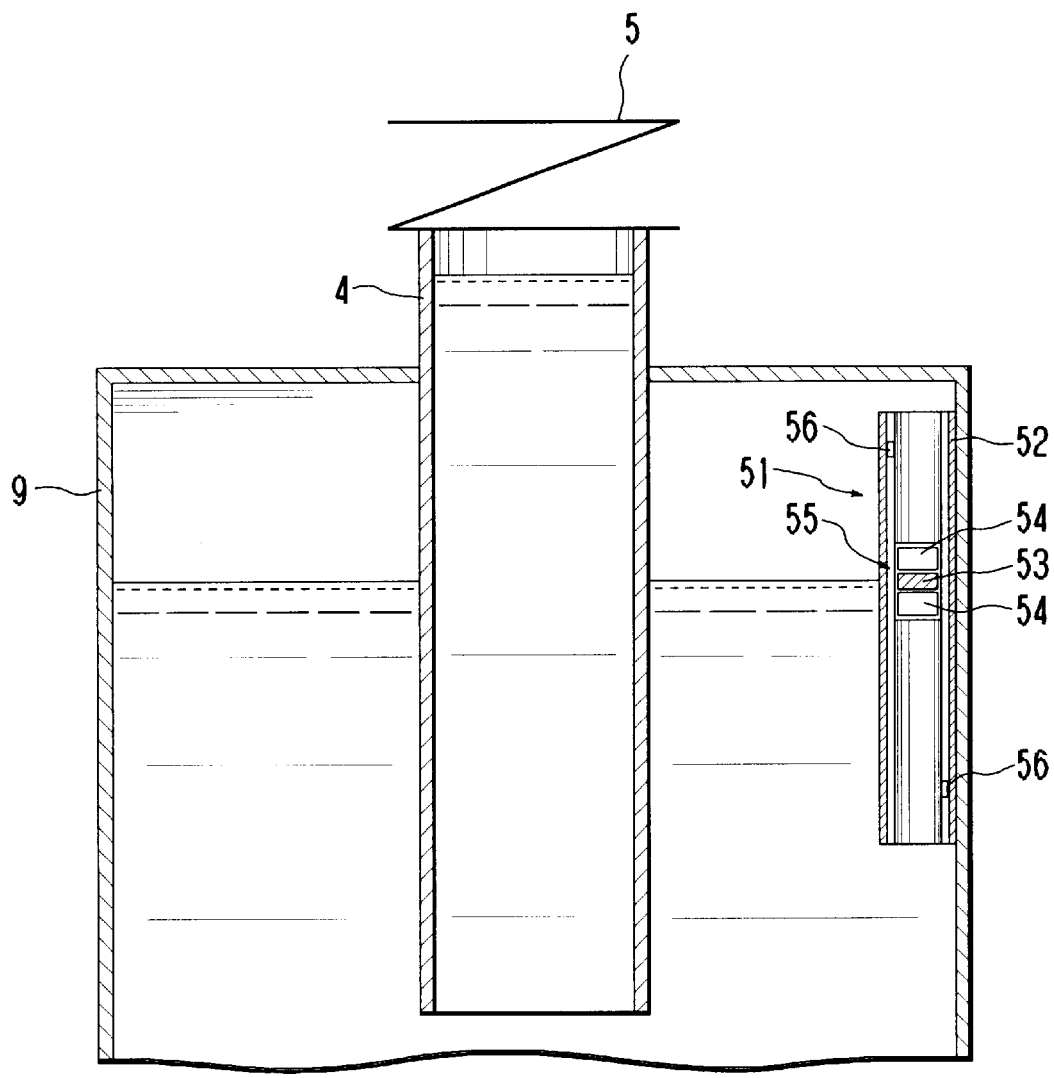
FIG. 9 is a sectional view for showing a state of installation of the water level sensor in respect to the high level water supplying and distributing system.

In the high level water supplying and distributing system of the preferred embodiment of the present invention, the water level in each of the water supplying tanks 2a, 2b, . . . can be controlled by fixing the water level sensor 51 to the upper ends of the water supplying tanks 2a, 2b, . . . as shown in FIG. 9 in place of the water level detecting means 10, intermittently operating the water supplying pump 6 in response to the detection of this water level.

That is, when the water surface is lowered and the permanent magnet 53 in the float 55 approaches the hall IC 56 at the lower side of the water level sensor 51, the sensor 51 outputs the H level and the control device 15 drives the water supplying pump 6 in response to the signal. After this operation, as the water level is increased under an operation of the water supplying pump 6, the hall IC 56 at the lower side of the water level sensor 51 outputs an L level signal, the upper side hall IC 56 outputs a H level signal and the control device 15 stops the operation of the water supplying pump 6.

In addition, in the case that the upper side hall IC 56 and the lower side hall IC 56 output the L level signal, it may also be applicable that a controlling operation for changing over the water supplying pump 6 into a low output operating state in sequence or a controlling operation for changing an interval of operation is carried out. The upper ends of the water supplying tanks 2a, 2b, . . . may be of a sealingly closed structure, a pressure adjustment may be carried out by opening or closing control at an air port or a released structure may be applied. Further, it may also be applicable that the water level sensor 51 is arranged not only at the water supplying tanks 2a, 2b, . . . , but also at any of the second water supplying tanks 24, 34 and the branch pipe 11 connected to these tanks in the aforesaid second preferred embodiment.

A fifth preferred embodiment of the present invention will be described. In the following description, the subject matter of the fifth preferred embodiment different from the aforesaid first preferred embodiment will be mainly described, and the same segments as those of the aforesaid first preferred embodiment are denoted by the same reference numerals and their description will be eliminated.

Figure 10:
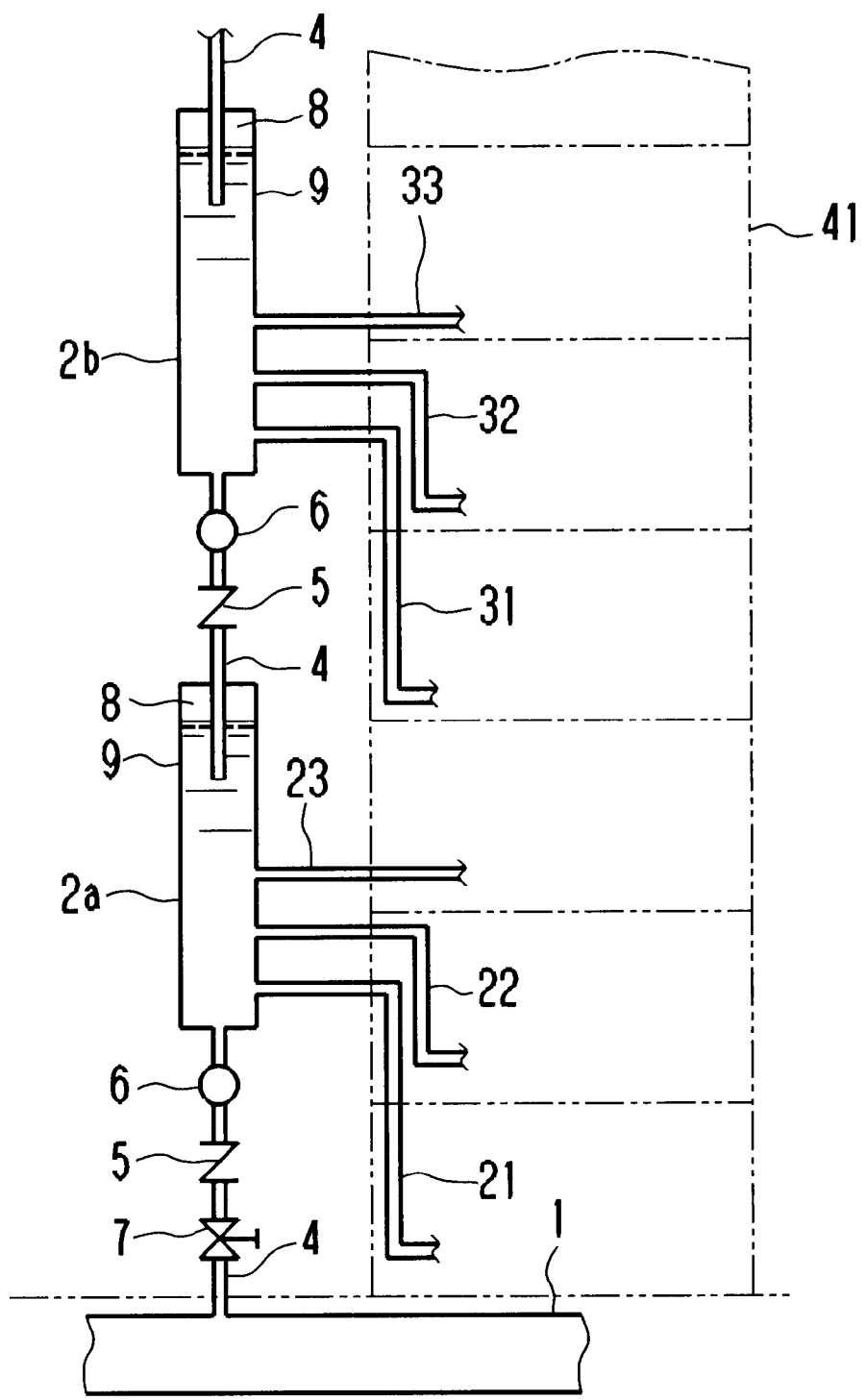
FIG. 10 is an illustrative view for schematically showing a structure of a high level water supplying and distributing system in a fifth preferred embodiment of the present invention.

In the preferred embodiment of the present invention, as shown in FIG. 10, the water level detecting means 10 is not provided, in place of it, the water supplying pump 6 corresponding to the water supplying tank 2 at the lowest floor is operated under its maximum output state (the maximum rotating speed), and after operation for a predetermined period of time, the pump is stopped. With such an arrangement as above, the water supplying tank 2 can be substantially full of water and the inner pressure of the water supplying tank 2 may also be set to the predetermined maximum value. Such an operation as above is carried out intermittently at a predetermined interval under a control of the control device 14. That is, both a volume and an operating interval of the pump 6 are set such that the water level in the tank can be maintained at a value substantially more than a predetermined value without reducing the pressure in the water supplying tank 2 to a value lower than a predetermined value even if the amount of water in the water supplying tank 2 is consumed by the water supplying pipes 21, 22, 23 connected to the water supplying tank 2 and the water supplying tank 2b at the upper floor under such an operation as above. Operation of the similar pump 6 is also carried out for the water supplying tank 2b at the upper floor or the water supplying tank at the far upper floor and water is fed in sequence to these water supplying tanks to cause the pressure and water level in the water supplying tank at each of the floors to be kept at a substantial specified range.

In addition, it may also be applicable that an amount of water within the water supplying tank is maintained in a specified range by a method wherein there is provided a pressure switch inside the pump 6, both an upper limit pressure and a lower limit pressure to be controlled are set and a pressure loaded to the pump 6 itself is controlled.

A sixth preferred embodiment of the present invention will be described as follows. In the following description, the subject matter of the sixth preferred embodiment different from the aforesaid first preferred embodiment will be mainly described, and the same segments as those of the aforesaid first preferred embodiment are denoted by the same reference numerals and their description will be eliminated.

Figure 11:
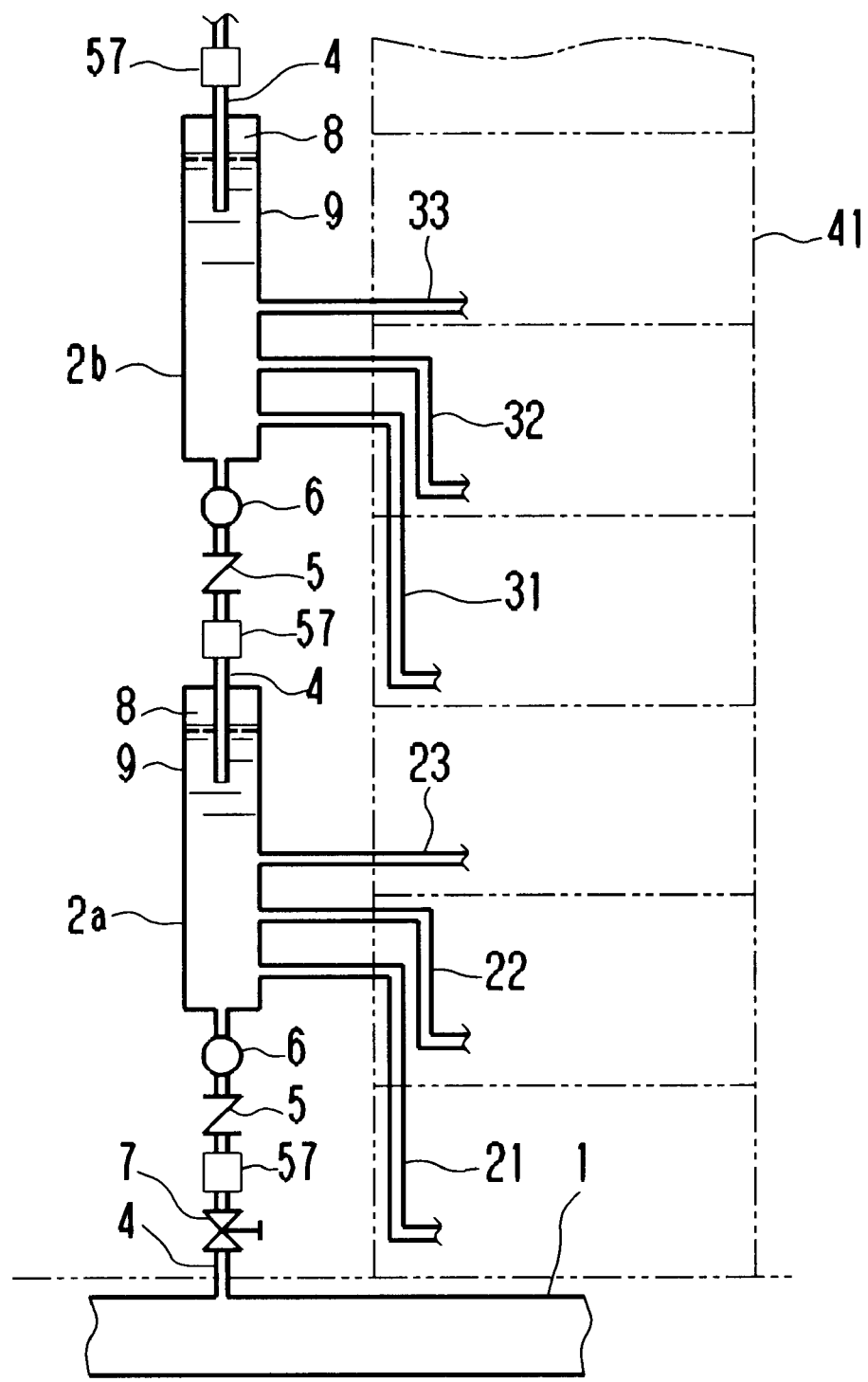
FIG. 11 is an illustrative view for schematically showing a structure of a high level water supplying and distributing system in a sixth preferred embodiment of the present invention.

In the preferred embodiment of the present invention, as shown in FIG. 11, in place of the hydraulic pressure detecting means 10, a flow meter 57 acting as a sensor is arranged at each of the connecting pipe passages 4, and the water supplying pump 6 connected to each of the connecting pipe passages 4 is controlled by the control device 14 in such a way that the pump is operated at the predetermined rotating speed and for a predetermined period of time. If the controlling operation is carried out such that the flow rate of the water supplying tank 2 at the lower floor is not lower than the flow rate of the water supplying tank 2b at the upper floor, the inner pressure and the water level in the water supplying tank at each of the floors can be maintained at values more than substantial predetermined constant value.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

The present application is based on Japanese Priority Documents 2000-32941 filed on Feb. 10, 2000 and 2000-224414 filed on Jul. 25, 2000, the content of which are incorporated herein by reference.

What is claimed is:

1. A high level water supplying and distributing system comprising:

a plurality of water supplying tanks arranged in series along a height direction;

water supplying pipes connected to each of the water supplying tanks;

a connecting pipe passage connecting the water supplying tanks to each other;

a water supplying pump arranged in the connecting pipe passage; and a check valve arranged in the connecting pipe passage.

2. A high level water supplying and distributing system according to claim 1, further comprising control means for controlling the pump in such a way that the pump may be intermittently operated at a specified output, for a predetermined operating time and at a predetermined time interval.

3. A high level water supplying and distributing system according to claim 1, further comprising a sensor for detecting a flow rate of water of at least one of the water supplying pipes; and control means for controlling the water supplying pump in response to the detecting signal of the sensor.

4. A high level water supplying and distributing system according to claim 1, further comprising water level detecting means for detecting a water level in the water supplying tank; and control means for controlling the water supplying pump in response to the detecting signal of this water level detecting means.

5. A high level water supplying and distributing system according to claim 1, further comprising a damper having an air chamber arranged to be sealingly closed at a predetermined location of the water supplying tank;

hydraulic pressure detecting means for detecting a hydraulic pressure in the water supplying tank;

control means for controlling an operation of the water supplying pump in response to a detecting signal of the hydraulic pressure detecting means.

6. A high level water supplying and distributing system according to claim 5, wherein the air chamber of the damper is arranged at the upper part of the water supplying tank and at a position higher than the lower end opening of the connecting pipe passage connecting the water supplying tank with the upper water supplying tank at the upper floor.

7. A high level water supplying and distributing system according to claim 5, wherein the hydraulic pressure detecting means is comprised of a branch pipe branched from the predetermined location of the water supplying tank and a pressure sensor fixed to a predetermined location of the branch pipe to detect an inside of the branch pipe.

8. A high level water supplying and distributing system according to claim 6, wherein the hydraulic pressure detecting means is comprised of a branch pipe branched from a predetermined location of the water supplying tank, and a pressure sensor fixed to a predetermined location of this branch pipe to detect an inner pressure.

9. A high level water supplying and distributing system according to claim 5, wherein a branch pipe has at its upper part a sealingly closed air chamber, and the pressure sensor is connected to the air chamber of the branch pipe.

10. A high level water supplying and distributing system according to claim 6, 7 or 8, wherein the branch pipe has at its upper part a sealingly closed air chamber, and the pressure sensor is connected to the air chamber of the branch pipe.

11. A high level water supplying and distributing system according to claim 5, wherein the hydraulic pressure detecting means is provided with a water level sensor for detecting a water level in the air chamber.

12. A high level water supplying and distributing system according to claim 6, wherein the hydraulic pressure detecting means is provided with a water level sensor for detecting a water level in the air chamber.

13. A high level water supplying and distributing system according to claim 5, wherein the water supplying pipe is connected to each of the water supplying tanks through a second water supplying tank, and a predetermined location in the second water supplying tank is provided with a damper having a sealingly closed air chamber.

14. A high level water supplying and distributing system according to claim 13, wherein the water supplying pipes are connected to each of the water supplying tanks through the second water supplying tank, and a predetermined location at the second water supplying tank is provided with a damper having a sealingly closed air chamber.

15. A high level water supplying and distributing system according to claim 5, wherein a plurality of the water supplying pumps having different outputs selectively driven in response to a high or low output of the hydraulic pressure detecting means are connected in parallel with the connecting pipe passage.

16. A high level water supplying and distributing system according to claim 15, wherein a plurality of the water supplying pumps having different outputs selectively driven in response to a high or low output of the hydraulic pressure detecting means are connected in parallel with the connecting pipe passage.

17. A high level water supplying and distributing system according to claim 1, wherein the plurality of water supplying tanks are arranged in series at a multistoried building along its height direction.

* * * * *